Sept. 9, 1930.  P. N. C. JAMES  1,775,104
WIND DIRECTION SIGNALING DEVICE FOR AIRCRAFT LANDING FIELDS
Filed Nov. 2, 1926
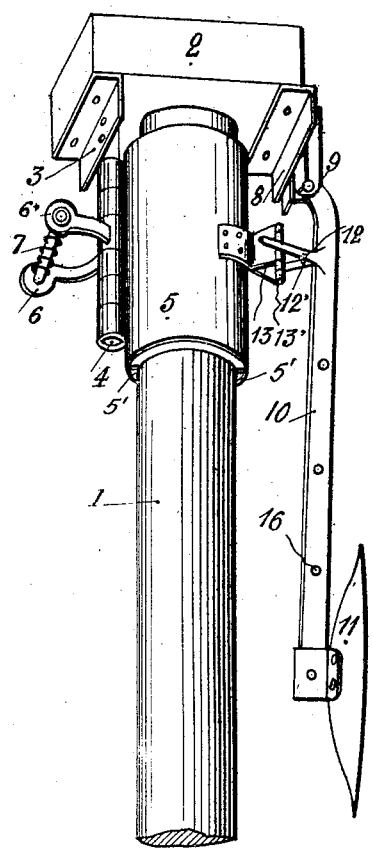
*Fig. 1*
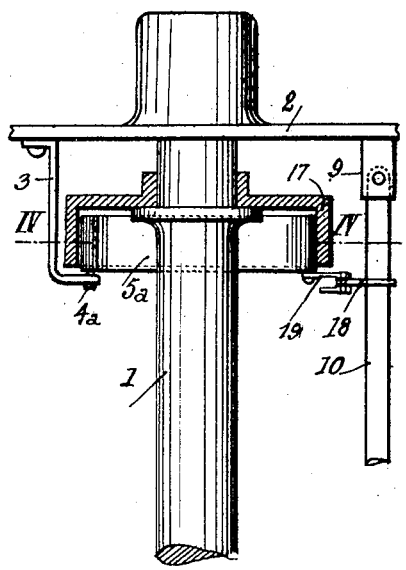
*Fig. 3*
*Fig. 4*
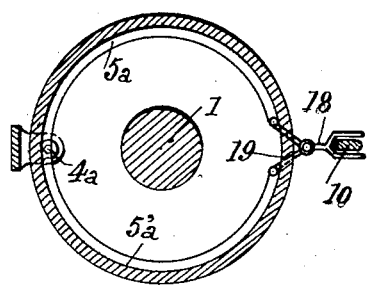
*Fig. 2*
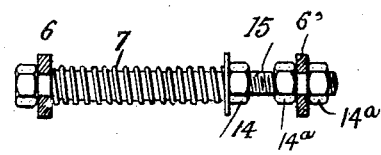
INVENTOR
Paul Nicolas Claude James
By
Attorney Patented Sept. 9, 1930

1,775,104

UNITED STATES PATENT OFFICE

PAUL NICOLAS CLAUDE JAMES, OF PARIS, FRANCE

WIND-DIRECTION SIGNALING DEVICE FOR AIRCRAFT-LANDING FIELDS

Application filed November 2, 1926, Serial No. 145,862, and in France November 5, 1925.

The invention relates to large sized vanes used upon aircraft landing fields to indicate to the pilot of an airship or aeroplane the direction from which the wind blows and thus enable him to determine the direction in which the landing may best be effected.

In order to secure stability, it has already been proposed to provide such vanes with water or oil brakes so as to dampen their oscillations, and to prevent them from following too rapidly any sudden wind gusts preserving, however, the full sensitiveness of orientation according to a fixed wind direction, or according to the mean of the instantaneous successive directions of a changeable wind. This stability is necessary in order that, seeing the vane for a short time only, the pilot will not be led into error as to the prevailing mean direction of the wind. The use of water or oil brakes presents however great disadvantages which are obviated by the device according to my invention.

One essential feature of the invention consists in providing a mechanical brake of any desired type between the rotating part or vane proper and its supporting column or stationary part; this brake directly or indirectly actuated under the control of an anemometer or preferably of an anemometric plate so that the gripping effect of the brake will automatically increase with and proportionally to the intensity of the prevailing wind.

The annexed drawing shows as example various embodiments of the invention. Figs. 1 and 2 show one embodiment of which Fig. 1 shows the object of the invention in perspective view, and Fig. 2 a detail part thereof. Figs. 3 and 4 show one embodiment in connection with a brake with exterior drum and brake shoes such as are commonly used upon automobiles, Fig. 3 being a central section and Fig. 4 a section on line IV—IV (Fig. 3).

Referring now to the drawing, 1 in Fig. 1 shows the stationary column and 2 the support of the indicating vane (not represented) mounted for free rotation upon the column 1. Two brake shoes 5, 5' articulated about a hinged pivot 4 and adapted to grip a part of the column 1 are fixed to the support 2 by means of an angle bar 3. The two shoes 5, 5' are provided with two levers 6, 6' the details of which are to be seen in Fig. 2. A spring 7 inserted between the two levers 6, 6' tends to release the brake shoes and thus prevent their friction upon the coresponding portion of the column. At the opposite side the support 2 carries an angle bar 8 with a crank pin 9 of a lever 10 extending downwardly, and provided at its lower edge with a preferably concave shaped anemometric plate 11; this lever is disposed in respect to the vane in such manner that the wind will strike the exterior concave face of the anemometric plate.

By moderate wind the whole of the vane with its support 2, the brake shoes 5, 5' and the lever 10, carrying the anemometric plate, rotate freely upon the column, the shoes being released due to the action of the spring 7. Two rods 12, 12' extend in V-shape from the lever 10 and act upon two stops 13, 13' fixed to the opening edges of the corresponding shoes. When the wind becomes stronger its action upon the anemometric plate tends to force the lever 10 toward the stationary column 1.

This pressure of the rods 12, 12' against the stops 13, 13' creates a tendency to rotate the shoes 5, 5' about the hinged pivot 4 and grip the stationary column 1. This tendency to grip the stationary column is opposed by the spring 7 which acts on the levers 6, 6' which are integral with the brake shoes 5, 5' respectively.

As a matter of fact brake regulating means must be provided.

The device of this invention is provided with three adjustments. One adjustment being the regulation of the point at which the brake shoes initially grip the column which is effected by varying the normal distance between the arms 6 and 6'. Nuts $14^a$ are threaded on the rod 15 on each side of the arm 6', see Fig. 2, providing a lock nut action when said arms 6 and 6' are spaced at the desired distance. Another adjustment is regulation of the gripping action of the brake shoes which is effected by varying the tension on the spring 7. A nut 14 is screwed upon the threaded portion of rod 15 and abuts one end of spring 7 which encircles rod 15. Movement of said nut 14 toward or away from arm 6 increases or decreases, respectively, the tension on said spring 7 to vary the gripping action of the brake shoes.

Still another adjustment is the regulation of the braking action in proportion to the velocity of the wind and this is effected by virtue of the fact that the anemometric plate 11 can be fixed at varying levels to the lever 10, such as for instance by means of a multiplicity of holes 16 so as to vary the length of the lever arm about the pivot 9 and consequently the intensity of the action exerted upon the shoes by the fork 12, 12'.

Figs. 3 and 4 show a further embodiment of the invention. The support 2 of the vane, as well as the brake shoes $5_a$, $5_a'$ of a so-called automobile brake, the pivot $4_a$ of which is carried by the angle bar 3 on the vane support, are rotatably mounted upon the column 1 by means of a supporting and ball bearing device which is not shown. These shoes operate within a drum 17 fixed to the column, and the arm of the lever 10, carrying the anemometric plate controls directly the shoes by means of the usual spacing rods 19.

It is well understood that these embodiments are shown and described by way of example only and that the details thereof may be widely varied without departing from the scope of the invention, the essential feature being that braking is effected by the action proper of the wind upon any suitable device.

Having thus described my invention what I claim as new, and desire to secure by Letters Patent is:

1. In combination with a rotatable wind vane signaling device for indicating the direction of the wind, for aircraft landing fields, a stationary element upon which said device is rotatably mounted, a brake placed between said device and said element, an anemometric plate mounted upon said rotatable signaling device, being able to be displaced with reference to the same, and disposed to be acted upon by the force of the wind, and power transmission means disposed between the said plate and the said brake for throwing the brake according to the force of the wind upon the said anemometric plate.

2. In combination with a wind vane signaling device for aircraft landing fields, a stationary element upon which said device is rotatably mounted, a brake placed betwen the said device and said element, a brake-releasing spring, an anemometric plate mounted upon the said signaling device, being able to be displaced with reference to the same and disposed to be acted upon by the force of the wind, and power transmission means disposed between the said plate and said brake for throwing the said brake.

3. In combination with a wind vane signaling device for aircraft landing fields, a stationary support upon which said device is rotatably mounted, a wind vane pivotally mounted thereon, brake segments mounted on the said wind vane, so as to coact with a brake drum mounted upon said stationary support, an anemometric plate mounted upon the said signaling device, being able to be displaced with reference to the vane and disposed to be acted upon by the force of the wind, and power transmission means disposed between the said plate and the said brake segments for throwing the brake according to the force of the wind upon the said anemometric plate.

4. In combination with a wind vane signaling device for aircraft landing fields, a stationary support upon which said device is rotatably mounted, a wind vane pivotally mounted thereon, brake segments mounted on the said wind vane, so as to coact with a brake drum mounted upon said stationary support, an anémometric plate mounted upon the said signaling device, being able to be displaced with reference to the vane and disposed to be acted upon by the force of the wind, and power transmission means disposed between the said plate and the said brake segments for throwing the brake according to the force of the wind upon the said anemometric plate and means for varying the ratio of the power transmission between the said anemometric surface and the brake segments.

5. In combination with a wind vane signaling device for aircraft landing fields, a stationary support upon which said device is rotatably mounted, a wind vane pivotally mounted thereon, brake segments pivoted upon a spindle carried upon the wind vane, said brake segments coacting internally with a drum carried upon the said stationary support, a lever pivoted on an axle mounted on the said wind vane, a plate mounted on the said lever and disposed in such manner as to receive the action of the wind, oblique rods mounted on the said lever in V disposition and coacting with abutments mounted on the expanding edges of the brake segments, whereby the force of the wind upon the said anemometric plate will tend to bring together the said abutments and to throw the brake.

6. In combination with a wind vane signaling device for aircraft landing fields, a stationary support upon which said device is rotatably mounted, a wind vane pivotally mounted thereon, brake segments pivoted upon a spindle carried upon the wind vane, said brake segments coacting internally with a drum carried upon the said stationary support, a lever pivoted on an axle mounted on the said wind vane, a plate mounted on the said lever and disposed in such manner as to receive the action of the wind, oblique rods mounted on the said lever in V disposition and coacting with abutments mounted on the expanding edges of the brake segments, a spring adapted to separate the brake segments for the braking release, said anemometric plate being adjustable upon the length of the lever.

In testimony whereof, I have signed my name to this specification.

PAUL NICOLAS CLAUDE JAMES.